United States Patent
Yukawa et al.

(10) Patent No.: US 6,557,605 B2
(45) Date of Patent: May 6, 2003

(54) PNEUMATIC TIRE WITH AXIALLY SPACED HIGH MODULUS EDGE BANDS AND LOW MODULUS MIDDLE BAND

(75) Inventors: Naoki Yukawa, Kobe (JP); Kazumi Yamazaki, Kobe (JP); Takashi Tanaka, Kobe (JP); Yasuo Wada, Kobe (JP); Makoto Hizume, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/985,140

(22) Filed: Nov. 1, 2001

(65) Prior Publication Data

US 2002/0079036 A1 Jun. 27, 2002

(30) Foreign Application Priority Data

Nov. 1, 2000 (JP) ........................................ 2000-334957

(51) Int. Cl.[7] ................................................. B60C 9/22
(52) U.S. Cl. ...................................... 152/531; 152/533
(58) Field of Search .................................. 152/531, 533

(56) References Cited

U.S. PATENT DOCUMENTS

| | | | | |
|---|---|---|---|---|
| 5,213,642 A | * | 5/1993 | Sponagel | 152/533 X |
| 5,795,417 A | * | 8/1998 | Damke et al. | 152/531 X |
| 5,922,154 A | * | 7/1999 | Lowenhaupt et al. | 152/531 |
| 6,058,996 A | * | 5/2000 | Suzuki | 152/533 X |

* cited by examiner

Primary Examiner—Adrienne C. Johnstone
(74) Attorney, Agent, or Firm—Birch, Stewart, Kolasch & Birch, LLP.

(57) ABSTRACT

A pneumatic tire comprises: a carcass extending between bead portions through a tread portion and sidewall portions; a breaker disposed radially outside a crown portion of the carcass; a pair of axially spaced high modulus edge bands disposed radially outward of edge portions of the breaker and each made of one or more high modulus cords having a sectional area SH and a 2% modulus MH and wound substantially parallel to the tire circumferential direction at a cord count DH; a low modulus middle band disposed radial outward of the breaker between the high modulus edge bands; and an elongation resistance index PH of each of the high modulus edge bands, which is defined as the product of the 2% modulus MH in N/sq.mm, the sectional area SH in sq.mm and the cord count DH per 1 cm width divided by 100, being in a range of 160 to 700.

5 Claims, 5 Drawing Sheets

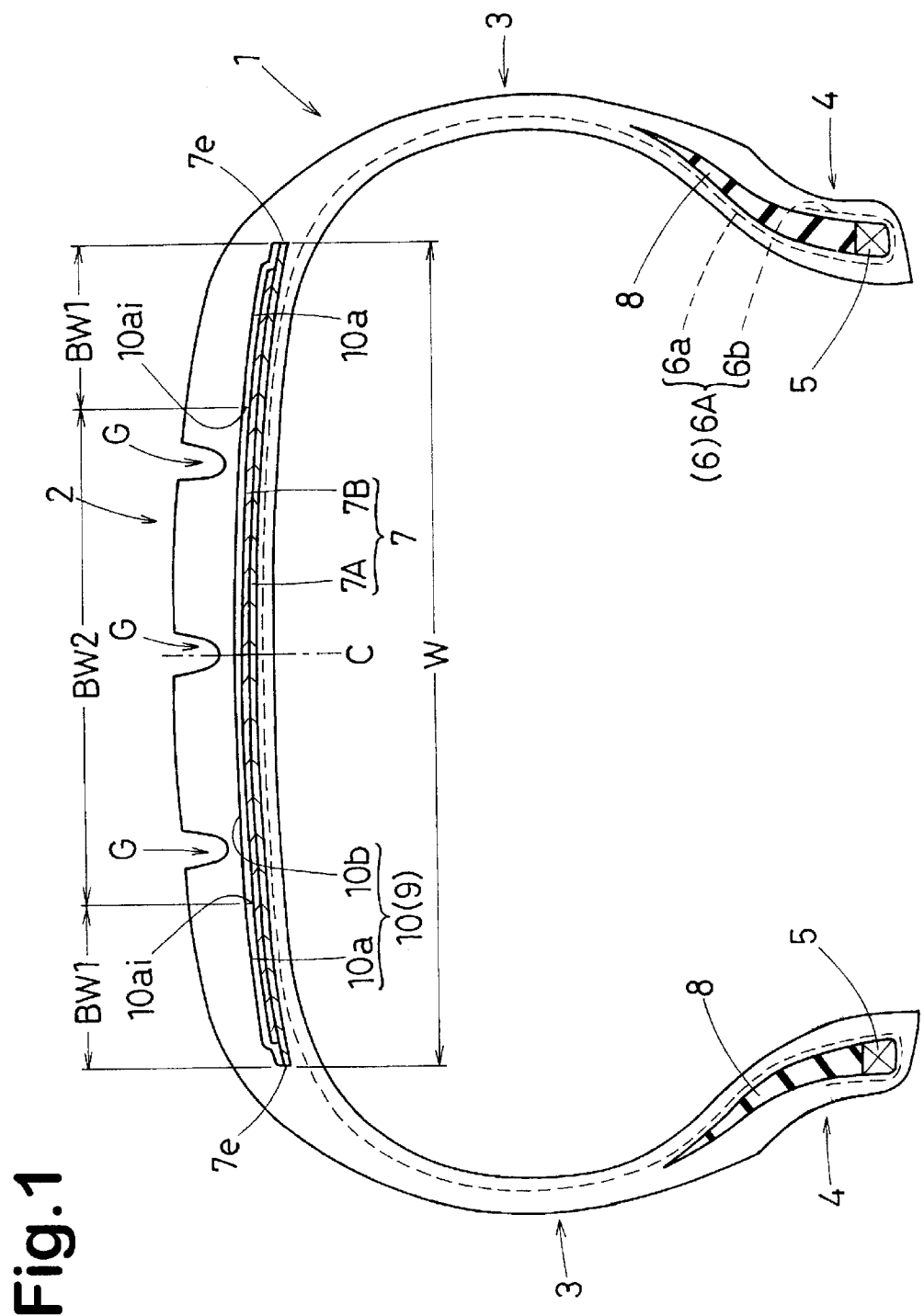

Comparison

Comparison

Comparison

Comparison

PNEUMATIC TIRE WITH AXIALLY SPACED HIGH MODULUS EDGE BANDS AND LOW MODULUS MIDDLE BAND

BACKGROUND OF THE INVENTION

The present invention relates to a pneumatic tire, more particularly to a tread reinforcing structure being capable of improving tire noise and rolling resistance.

In order to improve high-speed durability of a pneumatic tire especially a radial tire for passenger cars, as shown in FIG. 7A, a single-layered full-width band (b1) over a breaker (a) is widely used. Here, a band means a cord layer whose cord angle is less than about 10 degrees usually less than 5 degrees with respect to the tire equator, and a breaker means a cord layer whose cord angle is more than 10 degrees usually more than 15 degrees.

Such a single-layered full-width band (b1) can reduce a road noise around a frequency of 250 Hz heard on the inside of a vehicle during running. By using a higher tensile modulus cord in the band (b1), such a road noise may be reduced more, but a pass-by noise heard on the outside of a vehicle during running tends to increase. It is effectual in reducing the pass-by noise to use axially spaced edge bands (b2) on the edge portions of a breaker (a) as shown in FIG. 7B. Such axially spaced edge bands (b2) however, tend to increase the rolling resistance of the tire.

BRIEF SUMMARY OF THE INVENTION

It is therefore, an object of the present invention to provide a pneumatic tire, in which the rolling resistance and tire noise such as road noise and pass-by noise are improved.

According to the present invention, a pneumatic tire comprises a carcass extending between bead portions through a tread portion and sidewall portions, a breaker disposed radially outside a crown portion of the carcass, a pair of axially spaced high modulus edge bands disposed radially outward of edge portions of the breaker and each made of one or more high modulus cords having a sectional area SH and a 2% modulus MH and wound substantially parallel to the tire circumferential direction at a cord count DH, a low modulus middle band disposed radial outward of the breaker between the high modulus edge bands and made of one or more low modulus cords having a sectional area SL and a 2% modulus ML less than the 2% modulus MH and wound substantially parallel to the tire circumferential direction at a cord count DL, and an elongation resistance index PH of each of the high modulus edge bands, which is defined as the product of the 2% modulus MH in N/sq.mm, the sectional area SH in sq.mm and the cord count DH per 1 cm width divided by 100, being in a range of 160 to 700.

Further, an elongation resistance index PL of the low modulus middle band, which is defined as the product of the 2% modulus ML in N/sq.mm, the sectional area SL in sq.mm and the cord count DL per 1 cm width divided by 100, may be set in a range of not less than 30 but less than 160.

BRIEF DESCRIPTION OF THE DRAWINGS

Embodiments of the present invention will now be described in detail in accordance with the accompanying drawings.

FIG. 1 is a cross sectional view of a radial tire according to the present invention.

DETAILED DESCRIPTION

Figure 2A:
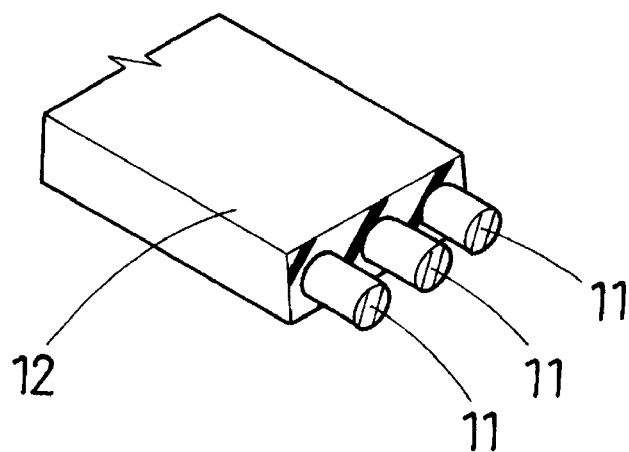
FIGS. 2A and 2B are perspective views of a rubber tape in which cords are embedded and a rubber coated single cord, respectively, which can be used to make a band.

In the drawings, pneumatic tire 1 according to the present invention comprises a tread portion 2, a pair of sidewall portions 3, a pair of bead portions 4, a carcass 6 extending between the bead portions 4, a breaker 7 disposed radially outside the carcass 6 in the tread portion 2, and a band 9 disposed on the radially outside of the breaker 7. The tread portion 2 is provided with tread grooves G which are circumferentially continuously extending grooves and/or circumferentially extending discontinuous grooves.

The tire 1 in this example is a passenger car radial tire having a relatively low aspect ratio of 60%. The aspect ratio is measured under a normally inflated unloaded state. The normally inflated unloaded state is such that the tire is mounted on a standard rim and inflated to a standard load but loaded with no tire load. The undermentioned tread width is the maximum axial width between the edges of the ground contacting area of the tread portion 2 under a standard loaded condition in which the tire is mounted on the standard rim and inflated to the standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The carcass 6 comprises at least one ply 6A of cords arranged radially at an angle of from 75 to 90 degrees with respect to the tire equator C, extending between the bead portions 4 through the tread portion 2 and sidewall portions 3, and turned up around the bead core 5 in each bead portion 4 from the inside to the outside of the tire so as to form a pair of turnups 6b and a carcass main 6a therebetween. For the carcass cords, organic fiber cords, e.g. polyester, nylon, rayon, aramid and the like and steel cords can be used. In this example, the carcass 6 is composed of a single ply 6A of polyester cords arranged radially at 90 degrees.

Between the carcass main 6a and turnup 6b in each of the bead portions, there is disposed a bead apex 8 of hard rubber extending radially outwardly from the bead core 5 while tapering towards its radially outer end.

The breaker 7 is composed of at least two cross plies 7A and 7B of cords laid parallel with each other at an angle of from 15 to 45 degrees with respect to the tire equator C. For the breaker cords, steel cords and high tensile modulus organic cords such as aramid, rayon and the like can be used. The width W of the breaker 7 is set in a range of from 80 to 110% of the above-mentioned tread width. In this example, steel cords are used, and the radially inner breaker ply 7A is wider than the radially outer ply 7B. The axial width W of the breaker 7 is defined as the axial width between the axial edges 7e of the widest ply 7A.

The band 9 includes a pair of axially spaced high modulus edge bands 10a disposed on edge portions of the breaker 7, and a low modulus middle band 10b disposed between the high modulus edge bands 10a.

Figure 2B:
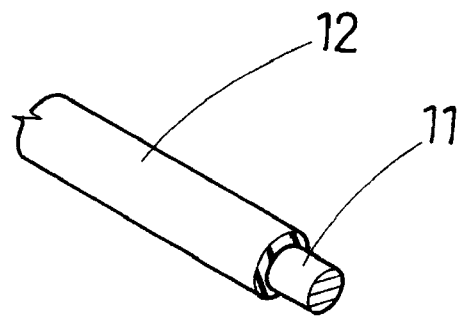

The band 10a, 10b is made of one or more cords wound on the radially outside of the breaker 7 so that the cord angle with respect to the tire equator becomes in a range of not more than 5 degrees. The band 10a, 10b may be formed by spirally winding a single cord 11 coated with a topping rubber 12 as shown in FIG. 2A or a plurality of cords 11 which are laid side by side and embedded in the topping rubber 12 into in a form of rubber tape as shown in FIG. 2B.

The high modulus edge band 10a is made of one or more high tensile modulus cords. On the other hand, the low modulus middle band 10b is made of one or more low tensile modulus cords having a tensile modulus lower than that of the high tensile modulus band cord.

As to the material of the high tensile modulus cords, polyethylene-2,6-naphthalate (PEN), aramid, polyparaphenylene benzobis oxazole (PBO), steel and the like cane be used. In addition to a cord made of a single material, a hybrid cord of two or more different organic filaments twisted together, for example PEN+aramid, aramid+PBO and the like may be also used. Preferably, an organic fiber cord having a 2% modulus MH of not less than 10000 N/sq.mm, more preferably not less than 12000 N/sq.mm is used.

The sectional area SH of the high tensile modulus cord is set in a range of not less than 0.05 ( sq.mm), preferably not less than 0.08 (sq.mm), more preferably 0.13 to 0.35 (sq.mm).

The cord count DH of the high tensile modulus cord(s) of the high modulus edge bands 10a is set in a range of from 5 to 23 (/1 cm), preferably 6 to 20 (/1 cm), more preferably 7 to 17 (/1 cm).

As to the material of the low tensile modulus cords, on the other hand, nylon, polyester, vinylon and the like can be used. Preferably, organic fiber cords having a 2% modulus ML of not more than 8000 N/sq.mm, more preferably in a range of from 1500 to 6000 N/sq.mm are used.

The sectional area SL of the low tensile modulus cord is set in a range of from 0.04 to 0.80 (sq.mm), preferably 0.08 to 0.54 (sq.mm).

The cord count DL of the low tensile modulus band cord(s) in the low modulus middle band 10b is set in a range of 6 to 20 (/1 cm), preferably 7 to 17 (/1 cm).

Here, the 2% modulus MH, ML of a band cord is the tensile modulus at 2% elongation of the cord measured according to the Japanese Industrial Standard-L1017, "Testing Methods for Chemical Fiber Tie Cords".

In the example shown in FIG. 1, the low modulus middle band 10b substantially abuts the high modulus edge bands 10a, whereby the band 9 as a whole covers the overall width of the breaker 7.

Figure 3:
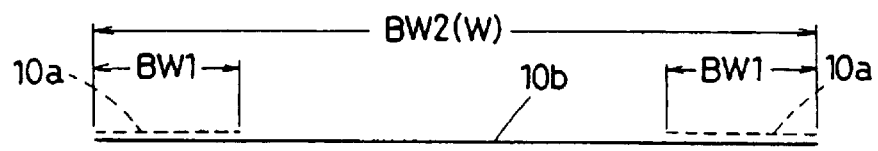
FIGS. 3, 4 and 5 each show an example structure of the band.

FIG. 3 shows a modification of the low modulus middle band 10b, which is extended to the axial edges of the breaker to cover the overall width of the breaker. The high modulus edge bands 10a are wound on the radially outside thereof. Thus, the band as a whole has a double layered structure in the tread shoulder portion.

Figure 4:
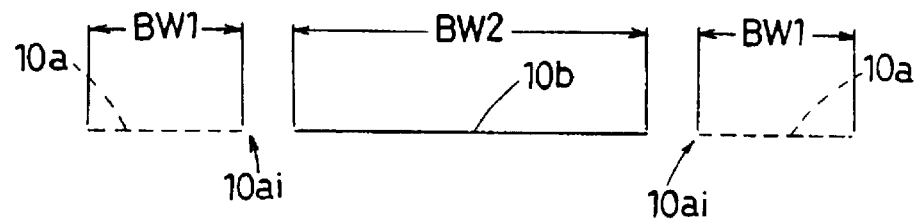

FIG. 4 shows another modification of the low modulus middle band 10b, which is decreased in the width and the axial edges of the low modulus middle band 10b are spaced apart from the axially inner edges 10ai of the high modulus edge bands 10a.

Figure 5:
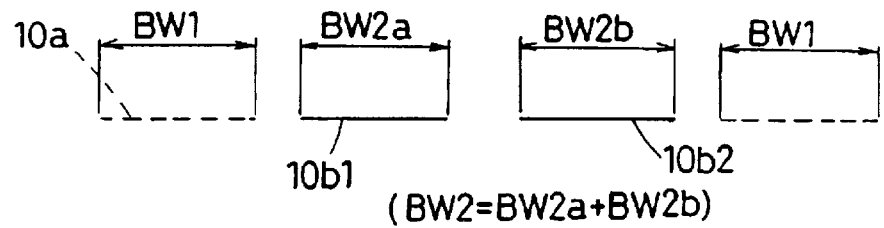

FIG. 5 shows still another modification of the narrowed low modulus middle band 10b shown in FIG. 4, which is split into two axially spaced middle bands 10b1 and 10b2.

Although all of the above-mentioned bands 10a and 10b (10b1, 10b2) are single-layered, they may be multi-layered.

In any case, it is preferable that a band exists beneath a circumferential groove G or the entire width of the circumferential groove G is crossed by the band. As a result, stress in the groove bottom can be mitigated and high-speed durability, a resistance to damage and the like can be improved. The axial edges of the band 9 as whole which are usually the axially outer edges of the edge bands are substantially aligned with the axial edges of the breaker 7 or positioned slightly axially outward thereof.

The axial width BW1 of each of the high modulus edge bands 10a is set in a range of from 3 to 44%, preferably 6 to 34%, more preferably 15 to 28% of the axial width W of the breaker 7. The total axial width BW2 of the low modulus middle band 10b or bands 10b1 and 10b2 is set in a range of not less than 8%, preferably not less than 20%, more preferably not less than 50% of the width W of the breaker 7. The width BW2 may be increased up to about 100% of the width W of the breaker 7 as shown in FIG. 3. Such widths W, BW1 and BW2 are measured under the above-mentioned normally inflated unloaded state of the tire.

In each of the high modulus edge bands 10a, an elongation resistance index PH defined as MH×SH×DH/100 is set in a range of from 160 to 700, preferably 160 to 400, more preferably 180 to 350.

In the low modulus middle band 10b, an elongation resistance index PL defined as ML×SL×DL/100 is set in a range of not less than 30 but less than 160, preferably in a range of from 30 to 120, more preferably in a range of from 50 to 100.

As described above, the unit of the 2% modulus MH, ML is N/sq.mm. The unit of the sectional area SH, SL is sq.mm. The cord count DH, DL is the count per a unit width of 1 cm.

The ratio (PH/PL) of the elongation resistance index PH to the elongation resistance index PL is preferably set in a range of from 2 to 5, preferably 2 to 3.

Therefore, the reinforcement by the high modulus edge bands 10a and low modulus middle band 10b is optimized between the tread crown portion and shoulder portion, and as a result, the road noise is reduced without deteriorating the pass-by noise and rolling resistance.

If the elongation resistance index PL is less than 30, the hoopping effect to the tread crown portion becomes insufficient and the rolling resistance increases. If the elongation resistance index PL is more than 160, the hoopping effect to the tread crown becomes excessive and the pass-by noise tends to increase.

If the ratio (PH/PL) is more than 5, the rigidity difference between the tread crown and tread shoulder increases, and as a result, the rolling resistance tends to increase. If the ratio (PH/PL) is less than 2, the road noise or pass-by noise becomes worse.

Comparison Tests

Test tires of size 195/60R15 91H (Rim size 15×6JJ) for passenger cars having the same structure shown in FIG. 1 except for the band structure were made and tested for the road noise, pass-by noise and rolling resistance. The specifications of the band are shown in Table 1.

1) Road Noise Test

A Japanese 2000 cc FF passenger car provided on all the four wheels with test tires (pressure 200 kPa) was run on an asphalt road having a smooth road surface at a speed of 50 km/hr, and a sound pressure level (dB) of 250 Hz was measured near the left ear of the driver using a ⅓ octave band pass filter. The results are indicated in Table 1 as a difference from Ref.1.

2) Pass-By Noise Test

According to the "Test Procedure for Tire Noise" specified in Japanese JASO-C606, a test car provided with test tires was coasted for 50 meters at a speed of 53 km/h in a straight test course (asphalt road) and the maximum noise sound level was measured with a microphone set at 1.2 meter height from the road surface and 7.5 meter sideways from the running center line. The results are indicated in Table 1 as a difference from Ref.1.

3) Rolling Resistance Test

Using a rolling resistance tester, the rolling resistance (N) of the test tire was measured under an inner pressure of 230 kPa, tire load of 4400 N and speed of 80 km/hr. Each measurement is divided by the tire load 4400 N and multiply by 104 and the obtained value is shown in Table 1 as a difference from Ref.1.

TABLE 1

Figure 6A:
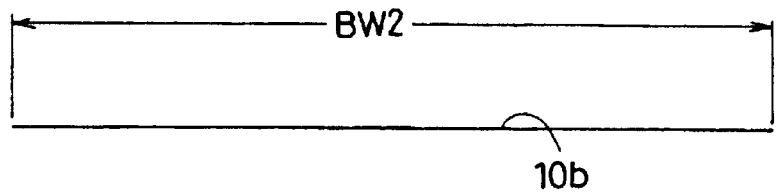
FIGS. 6A, 6B, 6C and 6D show band structures used in the undermentioned comparison tests.
Figure 6B:
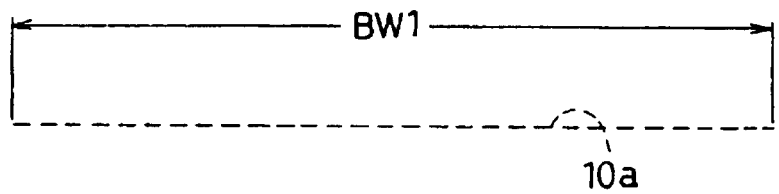
Figure 6C:
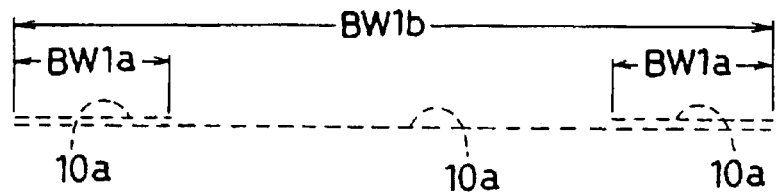
Figure 6D:
Figure 7A:
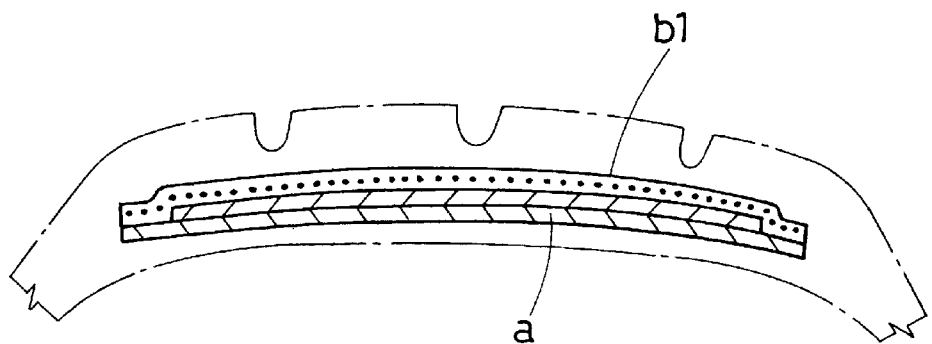
FIGS. 7A and 7B shows band structures in the prior arts.
Figure 7B:
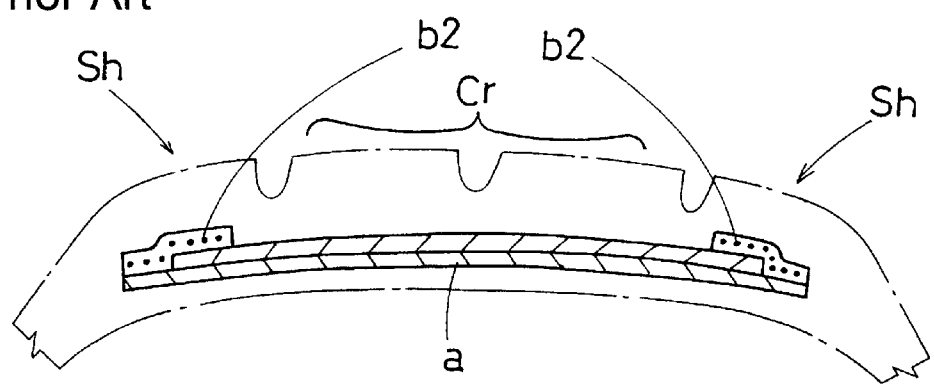

| Tire | Ref.1 | Ref.2 | Ref.3 | Ref.4 | Ex.1 | Ex.2 | Ex.3 | Ex.4 | Ex.5 | Ex.6 |
|---|---|---|---|---|---|---|---|---|---|---|
| Band structure | FIG.6A | FIG.6B | FIG.6C | FIG.6D | FIG.1 | FIG.3 | FIG.1 | FIG.1 | FIG.1 | FIG.1 |
| High modulus edge bands | | | | | | | | | | |
| Width BW1 (mm) | — | 148 | 30&148 | 30 | 30 | 30 | 30 | 30 | 30 | 30 |
| BW1/W (%) | — | 100 | 20.3&100 | 20.3 | 20.3 | 20.3 | 20.3 | 20.3 | 20.3 | 20.3 |
| Cord material | — | PEN | PEN | PEN | PEN | PEN | PEN | PEN | PEN | PEN |
| SH (sq.mm) | — | 0.162 | 0.162 | 0.162 | 0.162 | 0.162 | 0.162 | 0.324 | 0.324 | 0.162 |
| MH (N/sq.mm) | — | 12590 | 12590 | 12590 | 12590 | 12590 | 12390 | 12390 | 17680 | 12590 |
| DH/1 cm | — | 10 | 20&10 | 10 | 10 | 10 | 8 | 10 | 12 | 10 |
| PH | — | 204 | 408&204 | 204 | 204 | 204 | 161 | 401 | 687 | 204 |
| Low modulus middle band ply | | | | | | | | | | |
| Width BW2 (mm) | 148 | — | — | — | 88 | 148 | 88 | 88 | 88 | 88 |
| BW2/W (%) | 100 | — | — | — | 59.5 | 100 | 59.5 | 59.5 | 59.5 | 59.5 |
| Cord material | nylon | — | — | — | nylon | nylon | nylon | nylon | nylon | nylon |
| SL (sq.mm) | 0.248 | — | — | — | 0.248 | 0.248 | 0.248 | 0.248 | 0.248 | 0.195 |
| ML (N/sq.mm) | 3230 | — | — | — | 3230 | 3230 | 3230 | 3230 | 3230 | 1950 |
| DL/1 cm | 10 | — | — | — | 10 | 10 | 10 | 10 | 10 | 8 |
| PL | 80 | — | — | — | 80 | 80 | 80 | 80 | 80 | 30 |
| Test results | | | | | | | | | | |
| Road noise dB | 0 | −3.1 | −4.1 | −3.3 | −3.5 | −3.7 | −1.7 | −4.3 | −4.8 | −2.4 |
| Pass-by noise dB(A) | 0 | 0.5 | 0.2 | −0.6 | −0.6 | −0.6 | −0.6 | −0.6 | −0.5 | −0.6 |
| Rolling resistance | 0 | 3 | 8 | 13 | 0 | 2 | −2 | 4 | 6 | 2 |

| Tire | Ex.7 | Ex.8 | Ex.9 | Ex.10 | Ex.11 | Ex.12 | Ex.13 | Ex.14 | Ex.15 |
|---|---|---|---|---|---|---|---|---|---|
| Band structure | FIG.1 | FIG.3 | FIG.3 | FIG.3 | FIG.3 | FIG.4 | FIG.4 | FIG.3 | FIG.5 |
| High modulus edge bands | | | | | | | | | |
| Width BW1 (mm) | 30 | 5 | 10 | 50 | 60 | 30 | 30 | 30 | 30 |
| BW1/W (%) | 20.3 | 3.4 | 6.8 | 33.8 | 40.5 | 20.3 | 20.3 | 20.3 | 20.3 |
| Cord material | PEN | PEN | PEN | PEN | PEN | PEN | PEN | aramid | PEN |
| SH (sq.mm) | 0.162 | 0.162 | 0.162 | 0.162 | 0.162 | 0.162 | 0.162 | 0.111 | 0.162 |
| MH (N/sq.mm) | 12590 | 12590 | 12590 | 12590 | 12590 | 12590 | 12590 | 29703 | 12590 |
| DH/1 cm | 10 | 10 | 10 | 10 | 10 | 10 | 10 | 10 | 10 |
| PH | 204 | 204 | 204 | 204 | 204 | 204 | 204 | 330 | 204 |
| Low modulus middle band ply | | | | | | | | | |
| Width BW2 (mm) | 88 | 148 | 148 | 148 | 148 | 44 | 12 | 88 | 24 |
| BW2/W (%) | 59.5 | 100 | 100 | 100 | 100 | 29.7 | 8.1 | 59.5 | 16.2 |
| Cord material | nylon | nylon | nylon | nylon | nylon | nylon | nylon | nylon | nylon |
| SL (sq.mm) | 0.496 | 0.248 | 0.248 | 0.248 | 0.248 | 0.248 | 0.248 | 0.248 | 0.248 |
| ML (N/sq.mm) | 3230 | 3230 | 3230 | 3230 | 3230 | 3230 | 3230 | 3230 | 3230 |
| DL/1 cm | 10 | 10 | 10 | 10 | 10 | 10 | 10 | 10 | 10 |
| PL | 160 | 80 | 80 | 80 | 80 | 80 | 80 | 80 | 80 |
| Test results | | | | | | | | | |
| Road noise dB | −2.2 | −0.7 | −2.6 | −3.8 | −4 | −3.4 | −3.3 | −3.6 | −3.4 |
| Pass-by noise dB(A) | 0 | −0.1 | −0.3 | −0.5 | 0 | −0.6 | −0.6 | −0.6 | −0.6 |
| Rolling resistance | −1 | 0 | 1 | 2 | 0 | 1 | 2 | 0 | 1 |

PEN: Polyethylene-2,6-naphtalate
W = 148 mm

As described above, according to the present invention, the pneumatic radial tire can be improved in the road noise without deteriorating the pass-by noise and rolling resistance.

The present invention can be suitably applied to radial tires for passenger cars as above, but it may be also possible to apply the present invention to radial tires for light trucks, heavy duty radial tires and the like.

What is claimed is:

1. A pneumatic tire comprising
a carcass extending between bead portions through a tread portion and sidewall portions,
a breaker disposed radially outside a crown portion of the carcass and made of cords laid at an angle of 15 to 40 degrees with respect to the tire equator,
a pair of axially spaced high modulus edge bands disposed radially outward of edge portions of the breaker and each made of one or more high modulus cords having a sectional area SH and a 2% modulus MH and wound at a cord count DH,
a low modulus middle band disposed radially outward of the breaker between the high modulus edge bands and made of one or more low modulus cords having a sectional area SL and a 2% modulus ML less than the 2% modulus MH and wound at a cord count DL, and an elongation resistance index PH of each of the high modulus edge bands, which is defined as the product of the 2% modulus MH in N/sq.mm, the sectional area SH in sq.mm and the cord count DH per 1 cm width divided by 100, being in a range of 160 to 700.

2. The pneumatic tire according to claim 1, wherein
the axial width BW1 of each of the high modulus edge bands is in a range of from 3 to 44% of the axial width W of the breaker.

3. The pneumatic tire according to claim 1 or 2, wherein
the axial width BW2 of the low modulus middle band is in a range of not less than 8% of the axial width W of the breaker.

4. The pneumatic tire according to claim 1 or 2, wherein
an elongation resistance index PL of the low modulus middle band, which is defined as the product of the 2% modulus ML in N/sq.mm, the sectional area SL in sq.mm and the cord count DL per 1 cm width divided by 100, is in a range of not less than 30 but less than 160.

5. The pneumatic tire according to claim 1 or 2, wherein
an elongation resistance index PL of the low modulus middle band, which is defined as the product of the 2% modulus ML in N/sq.mm, the sectional area SL in sq.mm and the cord count DL per 1 cm width divided by 100, is in a range of not less than 30 but less than 160, and the ratio (PH/PL) of the elongation resistance index PH to the elongation resistance index PL is in a range of from 2 to 5.

* * * * *